April 28, 1964 J. E. J. FEUILLY 3,130,820
AUTOMATIC SLACK ADJUSTERS FOR BRAKES
Filed Oct. 23, 1961 3 Sheets-Sheet 3
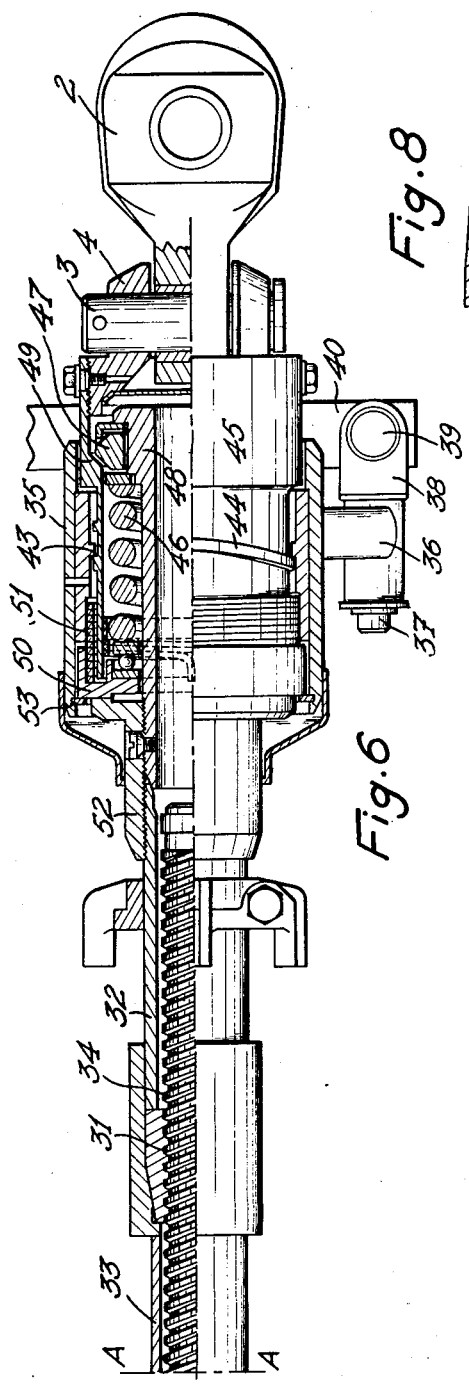
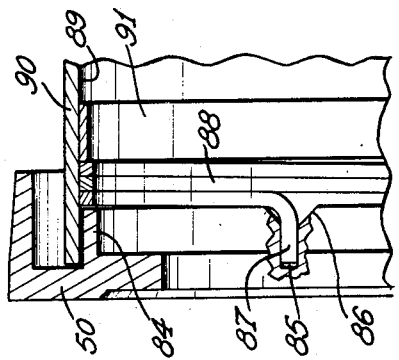
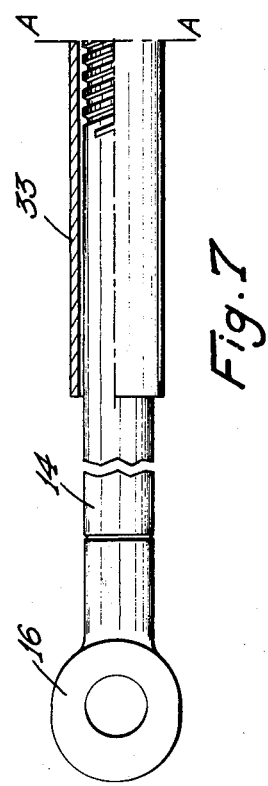

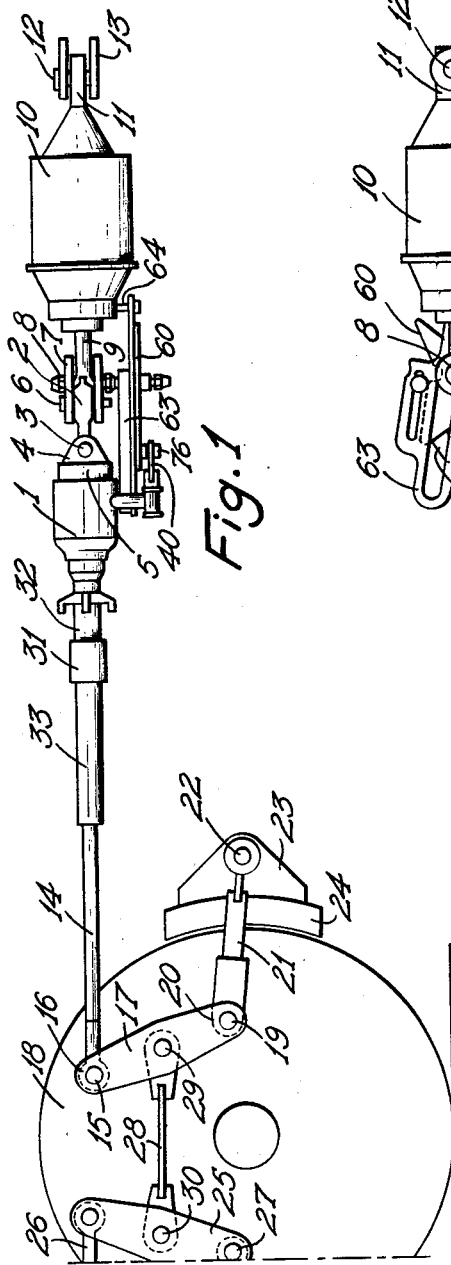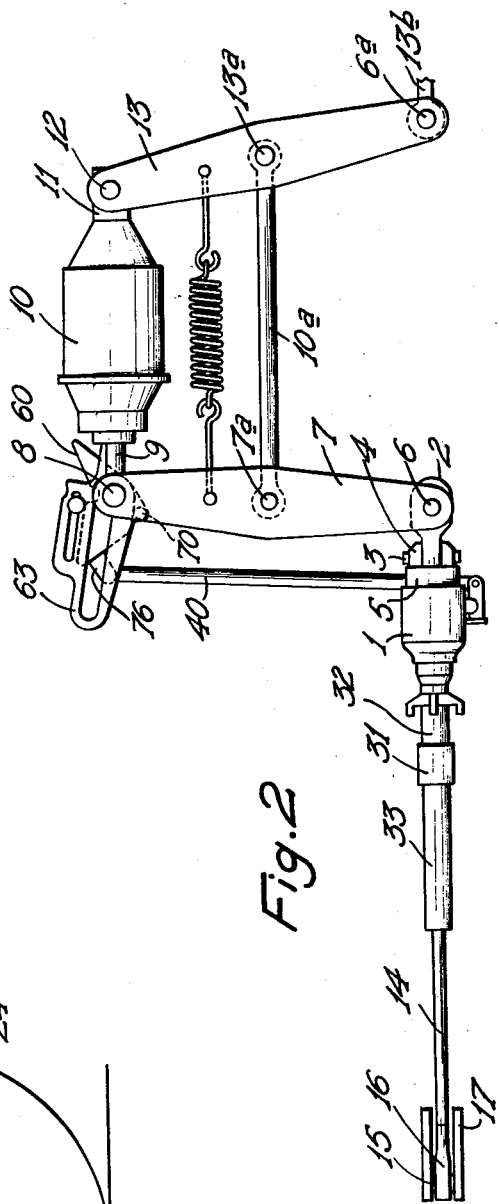

United States Patent Office 3,130,820
Patented Apr. 28, 1964

3,130,820
AUTOMATIC SLACK ADJUSTERS FOR BRAKES
Jules Emile Joseph Feuilly, Paris, France, assignor to Societe Generale Isothermos, Paris, France
Filed Oct. 23, 1961, Ser. No. 146,954
Claims priority, application France Nov. 4, 1960
5 Claims. (Cl. 188—199)

This invention relates to automatic slack adjusters for brakes.

Automatic slack adjusters for brakes which make use of an adjusting screw are mechanisms in which elongations are obtained by virtue of the reversibility between an adjusting screw, whose pitch is established accordingly, and a nut which is allowed to rotate freely during elongation of the adjuster, whereas shortening of the latter is performed by causing the nut to be screwed onto said screw in positive manner while excess slack or clearance is being taken up.

With such mechanisms, when the slack or clearance between the braking members and the surfaces to which they are applied, i.e. between brake-shoes and wheels in the case of most railway vehicles, is too small, the correct degree of clearance is restored the first time the brakes are applied. In contradistinction, when the slack clearance in question is too large, the process of its restoration to its correct value is very gradual only and is achieved only after the brakes have been repeatedly applied a comparatively large number of times.

It is the principal object of the invention to improve the operation of adjusters of this type by enabling the correct slack or clearance to be restored by a greatly reduced number of brake applications and releases in cases where the slack is too big.

Whereas in adjusters resorted to hitherto, screwing-up of the aforementioned nut is performed during brake releasing, such screwing-up never being effected during brake application. In the adjuster in accordance with the invention the nut is caused to screw up in both during brake release and during brake application, thereby at least doubling the capacity of such a device for taking up clearance.

To this end, the slideway and the actuating angle-lever of the adjuster of the type in accordance with the invention are devised so as to ensure that both during brake release and brake application the rocking angle-lever is made to oscillate across the position corresponding to the locked position of the driven adjuster. Thus, when the brakes are applied, the adjuster control casing begins to rotate in one direction (direction of clearance take-up) before rotating in the other, the aforementioned oscillation being repeated in reverse when the brakes are released, again beginning with a degree of clearance-take-up travel.

In one embodiment of such a mechanism, the angle-lever, which is carried by the crosshead pin of the braking piston rod, also passes through a piece which embodies an angled slideway and which is oscillatably mounted on an attachment pin, and said angle-lever is provided with three profiles which cooperate with two roller-equipped pegs, namely two frontal profiles separated by a notch to provoke tilting about the corresponding peg which is adjustable for position on the slideway-piece, and a dorsal profile cooperating with a fixed peg on the slideway-piece, cooperation between pegs and said frontal and dorsal profiles resulting in both the angle-lever and its associated slideway-piece returning into a fixed position.

In view of the fact that for each brake-application and brake-release stroke, the adjuster casing oscillates about the locked position, such a casing will unavoidably travel a certain distance in the unscrewing direction at each brake-operation; consequently, in accordance with the invention, in order to avoid inadvertent unscrewing of the nut which might tend to be initiated during the unscrewing stroke of the adjuster casing, an extra-motion discriminator is interposed between the actuating ring of the adjuster and some fixed portion of the latter, preferably its guide-sleeve.

Adjusting devices so designed possess greatly improved efficiency.

The description which follows with reference to the accompanying drawings given by way of example only and not in a limiting sense will give a clear understanding of how the invention may be performed.

FIG. 1 is a diagrammatic illustration of the general layout of a linkage adjuster used for a brake linkage, the latter being only partly shown.

FIG. 2 is a plan view corresponding to FIG. 1.

Figure 3:
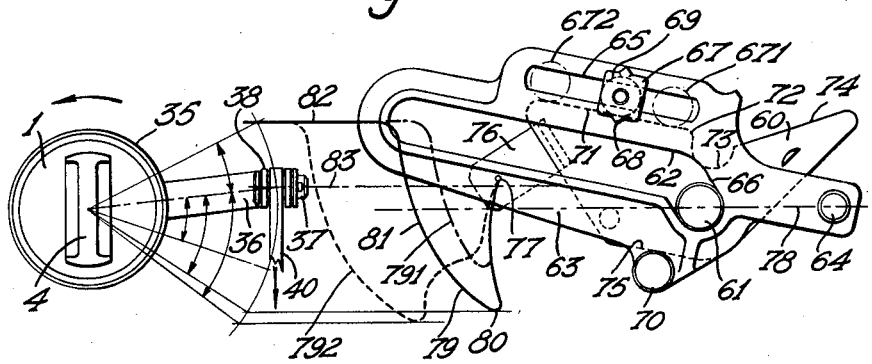

FIG. 3 is a diagrammatic illustration showing, in its right-hand portion, a plan view of the rocking angle-lever and the oscillating slideway-piece which control the adjuster casing actuating rod; in its central portion the curves followed, in the course of operation, by the angle-lever gudgeon, and, in its extreme left-hand portion, the adjuster casing with suitable indications of the corresponding angular positions.

Figure 4:
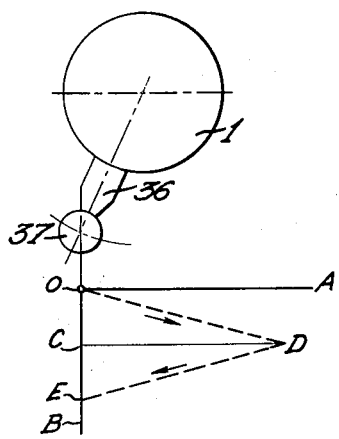

FIG. 4 is a diagrammatic illustration of the adjuster viewed endwise, showing the diagram of its displacements as they take place in adjusters of the known type.

Figure 5:
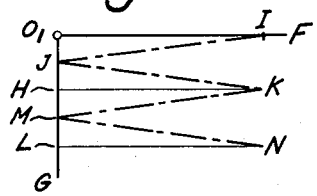

FIG. 5 is the functional diagram of an adjuster in accordance with the invention.

FIGS. 6 and 7, which join along the line A—A, are partial section views of the adjuster actuated by the angle-lever and the slideway-piece of FIG. 3.

FIG. 8 is a larger-scale view of the motion discriminator interposed between the adjuster actuating ring and its guide-sleeve.

In FIG. 1, there is shown a brake-linkage layout of a commonly known type, with an adjuster 1 interposed into a traction rod and fastened at one end by means of an eye 2 integral with a pin 3 which is inserted into a yoke 4 formed at the outer extremity of the adjuster guide-sleeve 5, the eye 2 being traversed by a pin 6 set perpendicular to pin 3 and passing through the end of one of the double beam-levers 7 of the brake-linkage. The pin 6 is placed at one end of the beam-lever 7, while at the other end of the latter is mounted a pin 8 forming part of the terminal crosshead of the rod 9 of a braking-piston cooperating with a cylinder 10, this cylinder being provided at its remote end with an eye 11 which is mounted, through the medium of a pin 12 which is the opposite member of pin 8, onto the corresponding end of a beam-lever 13 opposed to the beam-lever 7. The two beam-levers are coupled together by a reaction rod 10a hinged onto pins 7a and 13a located substantially midway along the beam-levers, and a return spring is fastened across them which becomes effective when the brakes are released.

The pin 6a of beam-lever 13, which corresponds to the pin 6 of beam-lever 7, acts upon a traction rod 13b terminating in a brake-rocker similar to those fitted, in the other direction, to the end of the rod which comprises the adjuster 1, as will be disclosed hereinbelow.

The adjusting rod 14, which constitutes the end of the adjuster opposite that formed by the coupling onto the guide-sleeve 5, is hinged, via a pin 15 and a corresponding eye 16, to the end of one of the rockers 17 of the brake system of a wheel 18, and the other end of this rocker 17 is coupled, via a pin 19 and a corresponding eye 20, to a draw-link 21 hinged via a pin 22 onto the support 23 of a brake-shoe 24. The wheel braking system further comprises a rocker 25 coupled to a rod 26 which is hinged onto a fixed point, said rocker actuating, via a pin 27 and similar components, a brake-shoe located substantially diametrically opposite in relation to the shoe 24, and the rockers 17 and 25 being coupled together by an intermediate reaction rod 28 attached via pins 29 and 30 to the central portions of the two rockers.

The adjusting rod 14 is capable, in known manner, of displacement relative to the body of the adjuster 1, the latter being provided to this end with a nut 31 integral with an adjustment tube 32 and a protective sheath 33 enclosing a screw-thread 34 cut at such an inclination that it is reversible within its associated nut 31 (FIGS. 6 and 7), this assembly being mounted rotatably within the body 1 and forming one element of the rotating portion of the adjuster.

Referring now to FIG. 6, it will be seen that the body 1 comprises, externally, a casing 35 which actuates the internal components and which is capable of rotating relative to the axis of the device by thrusting, via a corresponding thrust face, against the end of the coupling-sleeve and by rotating about a guide-sleeve, both of which will be described hereinbelow. To this end, the casing 35 has fixed to it an arm 36 onto whose end is pivotably mounted a trunnion 37 terminating in a yoke 38 which is attached via a pin 39 to a control rod 40 actuated, in the manner well known per se, by a pivoting angle-lever mounted on an extension of the pin 8 and which meets, in the course of its displacement along a slideway-piece, 63, a roller mounted in fixed but adjustable fashion on said slideway-piece.

The adjuster referred to above is reversible, that is to say it is capable, when the clearance between the brake-shoes 24 and the wheel 18 is too small, of providing an elongation when the brakes are applied, by the free unscrewing of the nut 31 on the rod 14, such unscrewing being arrested when the advancing motion of the pin 8 has caused the angle-lever in question to tilt to a sufficient degree and has thereby made the casing 35 pivot by the action of the rod 40 through the medium of arm 36.

The adjuster is furthermore capable, in accordance with the manner of functioning of this well-known type of mechanism, of causing the nut 31 to be positively rotated when the brakes are released, in the vent of there being too big a clearance between the shoes 24 and the wheel 18, in order to shorten the adjuster by screwing up the nut 31 on the thread 34 of the rod 14.

Indeed, as in the known types of mechanisms, the adjuster comprises, within the casing 35, a screw-thread 43 which cooperates with a conjugate screw-thread 44 carried by a guide-sleeve 45 integral with the yoke 4, there being an axial clearance provided between the thread 44 and the thread 43, and said guide-sleeve is equipped internally with a compression spring 46 whose action tends to cause a thrust ring 47, which is angularly fixed relative to a hollow shaft 48 fixed to the adjusting tube 32, to move away from a thrust seat 49 of conical shape mating with that of the ring 47 and which is provided on said guide-sleeve 45. The spring 46 is to this end interposed between a shoulder on the hollow shaft 48 and a ball thrust which is itself thrust against a driving ring 50 capable of being applied against the terminal rim of a coupling-sleeve 52, integral with the tube 32, thereby forming a flat clutch device, and also against a clip 53 inserted into a groove in the casing 35.

Furthermore, a butt-wound coil spring 51 has one of its ends attached to the drive-ring 50 and its other end is a friction fit in a corresponding bore in the casing 35. The coils of spring 51 are caused to be applied with force against said bore through their tendency to expand when rotating in one direction, thereby providing a coupling between the casing 35 and the drive ring 50, whereas free relative motion between the two is ensured in the opposite direction of rotation.

In a mechanism constituted thus, when the piston rod 9 moves forward in the course of braking, the rod 40 causes the casing 35 to rotate by the action of the aforementioned rocking angle-lever over its associated slideway-piece, thereby, enabling said casing to move forward through the medium of its thread 43 and the associated thread 44 of the guide-sleeve 45, so that the shifting assembly of the adjusted is displaced in a direction towards the left in FIGURE 6.

During this motion relative to the guide-sleeve 45, the thrust ring 47 moves closer to the thrust face 49 of said guide-sleeve.

If the clearance is too small, the braking components located on the side of the adjusting rod 14 become stationary in translation, as does also the shifting assembly of the adjuster. The guide-sleeve 45, which continues to be entrained by the brake-applying motion, causes, through the medium of the threads 44 and 43, the casing 35, the clip 53, the drive-ring 50 and the ball-thrust, compression of the spring 46 thereby reducing the friction between the ring 50 and the coupling-sleeve 52. Being no longer restrained by said friction, the reversing torque between the screw thread 34 and the nut 31 causes unscrewing of the adjuster. This unscrewing ceases as soon as the casing 35 has rotated through a sufficient angle to enable the shifting-assembly of the adjuster and, in particular, the hollow shaft 48 and its ring 47 to reach the bearing 49 on the guide-sleeve 45. Inadequate clearances are thus restored to their normal value as soon as the brakes are applied for the first time.

Conversely, if excessive clearance exists between the shoes 24 and the wheel 18, then, when the brakes are released, namely when the brake-piston rod 9 moves back into the cylinder 10, an angle-lever and a slideway of the usual type actuate the control rod 40 and also, via the latter's arm 36, the casing 35, thereby causing the latter to rotate in a direction opposite to that mentioned previously. In the course of this motion, as soon as relaxation of the compression spring 46 has reached the point where contact between the ring 47 and its seat 49 on the guide-sleeve 45 is broken, positive engagement of the spring 51 within the guide-sleeve rotates the drive-ring 50 and, via its flange, the coupling-sleeve 52, together with the adjusting tube 32 and the nut 31, the latter thus screwing onto the thread 34 and shortening the adjuster, thereby resulting in a taking-up of the clearance so as to restore it to normal.

It should be noted that in mechanisms resorted to hitherto, as may be seen in FIG. 4, each application of the brakes causes the casing of the adjuster 1 to be rocked by the arm 36 and that this single oscillation can be represented on a diagram in which the axis OA represents travel of the arm 36 and the axis OB travel of the brake cylinder, when the brakes are applied and when they are released. During brake application, represented by the segment OC, the line OD represents an unscrewing action of the adjuster nut, while during brake release the reverse travel shown by the line DE represents travel of the nut on the adjuster.

The device in accordance with the invention comprises a rocking angle-lever 60 mounted on an extension of the crosshead pin 8, and this pin 8 further carries a roller 61 designed to travel along a slot 62 in a slideway-piece 63, the latter being mounted freely oscillatable about a supporting pin 64 fixed to some stationary point such as the cap of the cylinder 10. A further slot 65 is cut in the slideway-piece 63, this second slot 65 being rectilinear and parallel to the straight portion of the slot 62.

This slot 62 includes a curved portion 66 on the side of attachment to the support 64. The slot 65 is associated with a peg 67 carrying a pointer 68 moving along a scale, while on the side of the slideway-piece adjoining the angle-lever this peg is fitted with a roller 69 designed to cooperate with said angle-lever.

Furthermore, again on its side nearest the angle-lever, the slideway 63 is provided with a fixed peg 70 which is likewise fitted with a roller.

Along its edge facing the roller 69, the angle lever 60 is provided with a straight profile 71 which is joined, via a rounded corner 72, to a notch 73 which is itself joined, via a further rounded corner, to a second profile 74 forming an obtuse angle with the profile 71. On its other side, the angle-lever 60 is provided with a dorsal profile 75 designed to cooperate with the roller of peg 70. The point of the angle-lever where the profile 71 terminates is provided with an attachment 76 fitted with a gudgeon 77, and onto this gudgeon is articulated the rod 40 which actuates the casing 35.

The mechanism described above functions in the following manner:

In the position shown in FIG. 3, which corresponds to a brake released position, the crosshead pin 8 and its roller 61 are in the rearward position nearest the cylinder in the slideway-piece 63, and hence at the bottom of the curved portion 66 of the slot 62. The rocking angle-lever 60 is retained by its profiles 71 and 75 between the two rollers 69 and 70, so that the system consisting of the angle-lever 60 and the slideway-piece 63 is held stationary, the piston rod 9 causing the roller 61 to travel along a straight path represented in FIG. 3 by the line 78 which contains the center of the pivot 64.

With the peg 67 in the position shown in FIG. 3, corresponding to the beginning of the application of the brakes, the system comprising the angle-lever 60 and the slideway-piece 63 commences a complex oscillation which is produced by the rectilinear forward travel of the roller 61, and this oscillation is represented on FIG. 3 by the curve 79 described by the gudgeon 77 and is reproduced, by virtue of the coupling consisting of the rod 40 and the arm 36, by the adjuster casing 35.

This curve 79 includes an arc which terminates at a point 80 and which is covered in a direction such that it corresponds to screwing up of the adjuster nut 31 on the screw-thread 34. Beyond this point 80, the backward tilting movement of angle-lever 60 in conjunction with the tilting of slideway-piece 63 lead to causing gudgeon 77 to travel over an arc 81 terminating in a straight portion 82 which is parallel to the line of travel of roller 61 (path corresponding to application of the brake-shoes against the wheel and to the elasticity present in the brake linkage), this straight portion being related to the sliding of the straight profile 74 beneath the roller 69, without any tilting action either by the angle-lever or the slideway-piece. The path represented by the arc 81 corresponds to a phase in the course of brake application during which the adjuster is unscrewed.

When the brakes are released, the backward travel of the roller 61 causes the portions 82, 81 and 80 of the curve to be covered in the reverse direction by the gudgeon 77 and, in the course of this return travel, the arc 81 causes the casing 35 to be actuated for screwing-up of the adjuster, while beyond the point 80 the arc of the curve covered corresponds to an unscrewing of the adjuster.

The diagram in FIG. 5 indicates, in the same way as FIG. 4, the actions described above; the axis $O_1F$ is analogous to the axis OA and the axis $O_1G$ analogous to the axis OB. During brake application, represented by the segment $O_1H$, the screw-up possibility of the nut 31, depending on travel of the arm 36, is shown by the curve segment IJ which corresponds to such screwing-up (shortening) of the adjuster (with the point J corresponding to the point 80), while the segment JK is equivalent to the unscrewing possibility open to the adjuster (arc 81). Brake release, represented by the segment HL, first involves covering the path of a segment KM corresponding to a fresh screwing-up possibility (shortening)—this path being covered in the opposite direction along arc 81 up to the point 80—and this segment KM is followed by a segment MN corresponding to an unscrewing possibility for the adjuster (elongation).

Such an arrangement provides for a twofold increase at least of the adjuster-shortening capacity each time the brakes are applied, since such shortening takes place initially, both when the brakes are applied and when they are released, whereas in arrangements resorted to hitherto such shortening was feasible only during one or the other of these braking phases, namely brake application or brake release.

It should be noted that, as in the case of the known types of adjuster, the peg 67 can be moved for initial setting within the slot 65 of the slideway-piece 63, such a setting being equivalent to initially fixing the degree of clearance between the brake-shoes and the wheels. Displacement of the peg 67 between the two extreme positions 671 and 672 merely results in slight deformations of the curved path followed by the peg 77, the curve 791 corresponding to the position 671 and the curve 792 to the position 672.

Thus in the course of brake application and brake release, the adjuster sustains an angular oscillation in the course of which, due to the motion of the casing 35 produced by the thread 43 acting upon the thread 44 of the guide-sleeve 45, the adjuster moves from a sector called the "free sector" to a sector called the "locked sector," and these sectors correspond to the positions wherein the stop-ring 47 is out of contact with its seat 49 and in contact therewith, respectively, yet without this entailing compression of the spring 46, the limit of these two sectors being represented in FIG. 3 by the line 83.

It should be noted that the inoperative position of the device described above, namely when the brakes are released, corresponds to a position of the gudgeon 77 which is situated, by construction, on the side of the locked sector with respect to the line 83. This being so, when the brakes are released, the stop-ring 47 is fetched back against the seat 49 on the guide-sleeve 45 after having been free, and this cooperation is designed to counter possible inadvertent unscrewings of the adjuster by the action of inertia forces set up in the brake linkage as the result of shocks, passage over points or crossings, bumps, etc.

Since in an adjuster operated by the angle-lever/slideway-piece system described above, each stroke includes, during brake application, an adjuster screw-up phase followed by an unscrew phase and, during brake release, a further screw-up phase and unscrew phase, it is necessary to ensure that the unscrewing phases cannot lead to inadvertent elongations of the adjuster by unscrewing of the nut 31 on the thread 34.

In order to overcome such a possible drawback, there is provided in accordance with the invention, a motion discriminator which is interposed between the drive-ring 50 and a non-rotating part of the adjuster, for example, guide-sleeve 45.

The drive-ring 50 is provided, in its internal rib 84, with a housing 85 the opening 86 of which is chamfered, and into this housing is slidingly fitted the axially bent end 87 of a butt-wound coil spring 88. This spring is frictionally fitted in an inner bore 89 of the skirt 90 of the guide-sleeve 45, said skirt being provided with an external screw-thread 44. The spring is retained endwise by a ring 91 which is upright inside the bore 89.

The relaxed diameter of the spring 88 is slightly greater than the inner diameter of the bore 89 and the direction of coiling of the spring 88 is such that the latter, on being stretched, is applied against the wall of the bore 89 when the drive-ring tends to turn in the direction corresponding to unscrewing of the nut 31 on the thread 34, i.e. in the direction corresponding to elongation of the adjuster. In the opposite direction, conversely, the spring 88 is free to slip over the surface of the bore 89.

Thus any movement of the casing 35 in the direction tending to shorten the adjuster is transmitted to the ring 50 by the spring 51, and via 50 to the nut 31 through clip 53 and the sleeve 52. Any movement in the direction tending to unscrew the casing 35 is arrested at the ring 50 which is retained by the spring 88.

Such movements, which are liable to occur when the casing 35 is placed in a free sector, cannot therefore be transmitted to the nut 31 in the direction of unscrewing on the rod 14, but can be transmitted thereto in the direction of screwing up.

It is to be clearly understood that many modifications can be made to the embodiments described above without departing from the scope of the invention.

What I claim is:

1. In an automatic slack adjuster for brakes inserted in a brake linkage assembly, a two-part brake rod one part of which is displaceable axially in relation to the other rod part and which brake rod is of the type having a non-selflocking screw-threaded spindle in meshing engagement with a nut carried by said other rod part, an operating member slidable axially on, and rotatable around, said other rod part and adapted to be displaced thereon in one axial and rotary direction upon application of the brakes and in the other axial and rotary direction upon release of the brakes under the action of a brake control device having a brake piston and a brake cylinder, and two clutch systems for respectively coupling said other rod part immediately to said operating member, under the control of the movements of said operating member in one of said both axial and rotary directions in order to generate a controlled displacement of said nut on said spindle in one direction, and with a delay to a stationary part of the adjuster, under the control of the movements of said operating member in the other one of said both axial and rotary directions in order to allow a free displacement of said nut on said spindle in a reverse direction; the improvement which comprises means interconnecting the operating member and the brake control device for controlling the simultaneous axial and rotary movements of said operating member, and means for successively imparting to said operating member through said controlling means, both during application of the brakes as well as upon release of the brakes, simultaneous axial and rotary movements in a direction allowing the controlled screwing up of the nut on the spindle, and simultaneous axial and rotary movements in the reverse direction corresponding to the free unscrewing of said nut on said spindle, said adjuster further comprising a radial arm on the operating member, said means controlling said operating member comprising an angle-lever, a pivot pin at right angles to the operating member axis and carried by the rod of the brake piston, said angle-lever being pivotally mounted on the rod of the brake piston, and a rod interconnecting said angle-lever and said radial arm, said means for successively imparting to said operating member, upon application and release of the brake, movements, comprising, a slideway-piece extending over said angle-lever and pivotally mounted about a point located on the line of travel of said pivot pin in the direction of brake release, and means interconnecting said angle-lever and said slideway-piece for oscillating said angle-lever first in one direction and then in the other direction across the position thereof corresponding to the engagement of the clutch system which couples the other rod part to the stationary part of the adjuster, both upon application of the brakes as well as upon release of the brakes, the one direction corresponding to the controlled screwing up of the nut on the spindle.

2. In an automatic slack adjuster for brakes inserted in a brake linkage assembly, a two-part brake rod one part of which is displaceable axially in relation to the other part and which brake rod is of the type having a non-selflocking screw-threaded spindle in meshing engagement with a nut carried by said other rod part, an operating member slidable axially on, and rotatable around, said other rod part and adapted to be displaced thereon in one rotary direction upon application of the brakes and in the other axial and rotary direction upon release of the brakes under the action of a brake control device having a brake piston and a brake cylinder, and two clutch systems for respectively coupling said other rod part immediately to said operating member, under the control of the movements of said operating member in one of said both axial and rotary directions in order to generate a controlled displacement of said nut on said spindle in one direction, and with a delay to a stationary part of the adjuster, under the control of the movements of said operating member in the other one of said both axial and rotary directions in order to allow a free displacement of said nut on said spindle in a reverse direction; the improvement which comprises means interconnecting the operating member and the brake control device for controlling the simultaneous axial and rotary movements of said operating member, and means for successively imparting to said operating member through said controlling means, both during application of the brakes as well as upon release of the brakes, simultaneous axial and rotary movements in a direction allowing the controlled screwing up of the nut on the spindle, and simultaneous axial and rotary movements in the reverse direction corresponding to the free unscrewing of said nut on said spindle, said adjuster further comprising a radial arm on the operating member, said means controlling said operating member comprising a pivot pin carried by the rod of the brake piston at right angles to the operating member axis, an angle-lever pivotally mounted on said pivot pin and having a set of three rectilinear profiles, the first profile being disposed on the part of said angle-lever opposite to the operating member with respect to said pivot pin and forming, in the brake release condition, an acute angle with the direction of brake application, the second profile disposed on the same part of the angle-lever forming an obtuse angle with the first profile to which it is connected by a notch, the third profile being parallel to the first one and disposed opposite to said first profile with respect to said pivot pin, a projecting attachment carried by said angle-lever between the first and third profiles close to said first profile, a gudgeon fixed on said attachment, a first roller pivotally mounted on said pivot pin, and a rod interconnecting said gudgeon and said radial arm; said means for successively imparting to said operating member, both upon application and release of the brakes, movements allowing the controlled screwing up and the free unscrewing of the nut on the spindle comprising a slideway-piece extending over said angle-lever, pivotally mounted about a point located on the line of travel of said pivot pin in the direction of brake release and provided with a rectilinear slot parallel to said first profile in the brake release condition and disposed on the part of said piece opposite to the operating member with respect to said pivot pin and with a bent slot having a first rectilinear portion, which, in the brake release condition, engages said first roller and forms with the direction of brake application on the side thereof opposite to the operating member an acute angle greater than that formed by the first profile, and a second rectilinear portion parallel to said rectilinear slot and extending said first rectilinear portion in the direction of brake application, a second roller adapted to engage said first and second profiles, means adjustable in said rectilinear slot and carrying said second roller, and a third roller secured on said slideway-piece and engaging said third profile.

3. In an automatic slack adjuster for brakes inserted in a brake linkage assembly, a two-part brake rod one part of which is displaceable axially in relation to the other rod part and which brake rod is of the type having a non-selflocking screw-threaded spindle in meshing engagement with a nut carried by said other rod part, an operating member slidable axially on, and rotatable around, said other rod part and adapted to be displaced thereon in one axial and rotary direction upon application of the brakes and in the other axial and rotary direction upon release of the brakes under the action of a brake control device having a brake piston and a brake cylinder, and two clutch systems for respectively coupling said other rod part immediately to said operating member, under the control of the movements of said operating member in one of said axial and rotary directions in order to generate a controlled displacement of said nut on said spindle in one direction, and with a delay to a stationary part of the adjuster, under the control of the movements of said operating member in the other one of said both axial and rotary directions in order to allow a free displacement of said nut on said spindle in a reverse direction; the improvement which comprises means interconnecting the operating member, and means for successively imparting to said operating member through said controlling means, both during application of the brakes as well as upon release of the brakes, simultaneous axial and rotary movements in a direction allowing the controlled screwing up of the nut on the spindle, and simultaneous axial and rotary movements in the reverse direction corresponding to the free unscrewing of said nut on said spindle, said adjuster further comprising a radial arm on the operating member, said means controlling said operating member comprising an angle-lever, a pivot pin at right angles to the operating member axis carried by the rod of the brake piston and on which said angle-lever is pivotally mounted, and a rod interconnecting said angle-lever and said radial arm, said means for successively imparting to said operating member, both upon application and release of the brakes, movements allowing the controlled screwing up and free unscrewing of the nut on the spindle comprising a slideway-piece extending over said angle-lever and pivotally mounted about a point located on the line of travel of said pivot pin in the direction of brake release, and means interconnecting said angle-lever and said slideway-piece for successively imparting to the junction point of said rod with said angle-lever, from the beginning to the end of a brake application operation, a first curvilinear path towards the operating member with its concavity directed towards the pivot pin, a second curvilinear path away from said operating member and extending in the direction of brake application with its concavity directed towards said pivot pin, and a rectilinear path parallel to, and in the direction of, the brake application stroke of the pivot pin and, from the beginning to the end of a brake release operation, said rectilinear path, then said second and first curvilinear path in the reverse direction.

4. In an automatic slack adjuster for brakes inserted in the brake linkage assembly, a two-part brake rod one part of which is displaceable axially in relation to the other rod part and of the type having a non-selflocking screw-threaded spindle in meshing engagement with a nut carried by said other rod part which is surrounded by a movable casing simultaneously displaceable rotatably around, and axially on, said other rod part under the action of a brake control device and adapted to be thus displaced, on the one hand, away from the nut while allowing a free unscrewing of said nut on the spindle until a clutch element carried by said other rod part engages a clutch surface provided on a stationary guide-sleeve housed in said casing and, on the other hand, towards said nut while engaging a clutch system connected to said other rod part for generating a controlled screwing of said nut on said spindle; the improvement which comprises a driving-ring included in the clutch system and freely mounted within the casing around the other rod part, a spring having butt-wound coils connected to, and housed within, said driving-ring while in sliding engagement with the casing for the mutual connection of said casing and driving ring by spreading of the coils of the spring during displacement of said casing towards the nut, and means for locking said driving-ring as soon as the casing tends to generate a motion of said other rod part adapted for causing unscrewing of the nut on the spindle.

5. An automatic slack adjuster according to claim 4, wherein the stationary guide-sleeve has a part surrounded by the spring, and wherein the locking means comprises a coil spring having one end bent axially and slidingly fitted into the driving-ring, said spring having a relaxed diameter slightly greater than the inner diameter of the stationary guide-sleeve and being fitted in said guide-sleeve in pre-stressed condition with its direction of coiling so determined that the coils thereof are spread open when the driving-ring tends to turn in the direction corresponding to unscrewing of the nut on the spindle, under the influence of the casing.

References Cited in the file of this patent
UNITED STATES PATENTS
1,983,897    Browall _____ Dec. 11, 1934